March 2, 1943.    F. K. LOOMIS    2,312,345
WHEEL
Filed Nov. 1, 1941    3 Sheets-Sheet 1
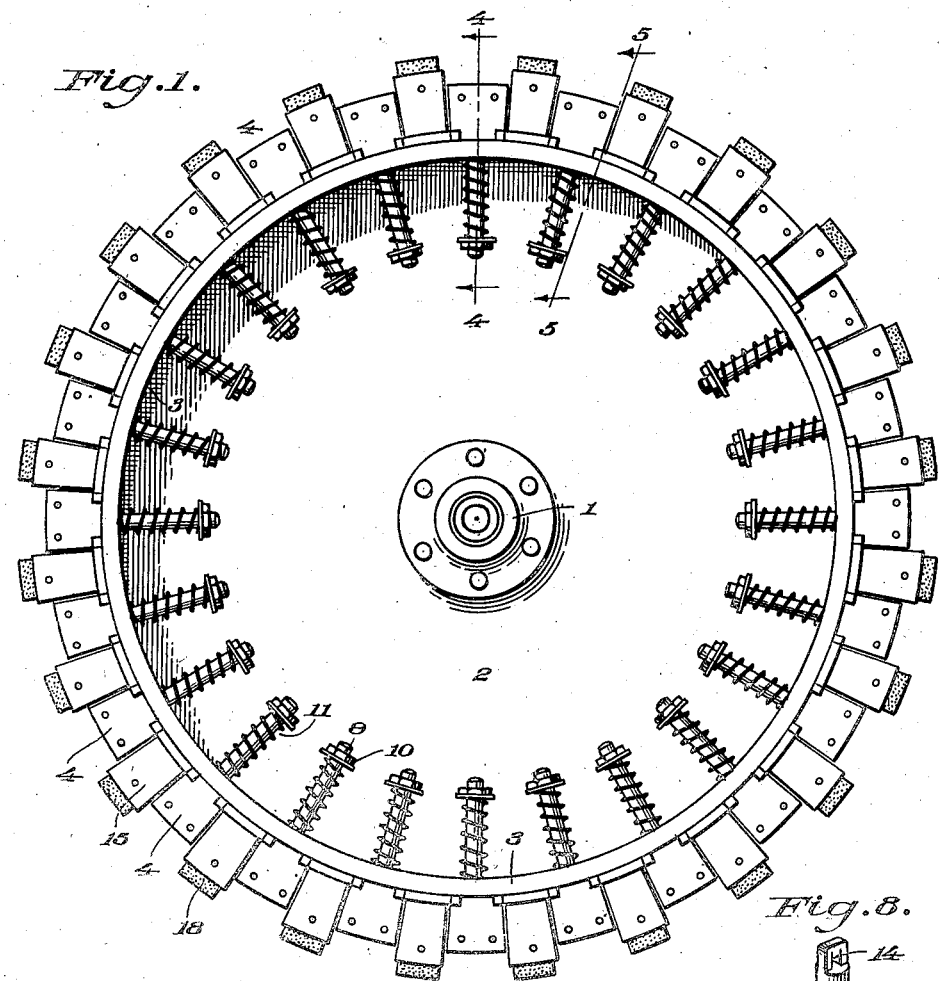
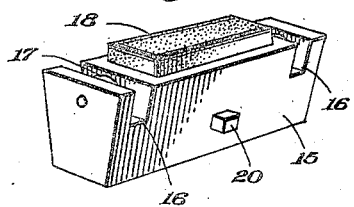
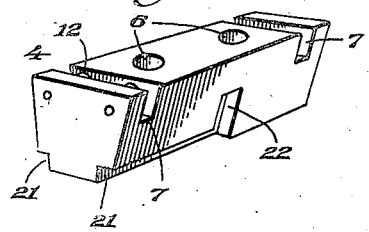
Frank K. Loomis, INVENTOR
BY Victor J. Evans & Co.
ATTORNEY March 2, 1943.  F. K. LOOMIS  2,312,345
WHEEL
Filed Nov. 1, 1941  3 Sheets-Sheet 3

Frank K. Loomis, INVENTOR
BY Victor J. Evans & Co.
ATTORNEY

Patented Mar. 2, 1943

2,312,345

UNITED STATES PATENT OFFICE 2,312,345

WHEEL

Frank K. Loomis, New Paltz, N. Y.

Application November 1, 1941, Serial No. 417,548

5 Claims. (Cl. 152—20)

This invention relates to vehicle wheels and its primary object is to provide a wheel which will possess a high degree of resiliency but will not require the use of pneumatic tires, thereby avoiding the disadvantages of a punctured tire without sacrificing any of the riding qualities.

The invention seeks to provide a spring wheel which will be strong and durable, adapted for use upon heavy trucks as well as upon light pleasure vehicles, and also seeks to provide a wheel in which the ground-engaging elements may be placed under any degree of tension according to the load which will be normally carried by the vehicle to which the wheel is applied.

These stated objects and other objects which will appear incidentally in the course of the following description are attained in such a structure as is illustrated in the accompanying drawings and the invention resides in certain novel features which will be particularly pointed out in the appended claims.

In the drawings:

Figure 1 is a side elevation of a wheel embodying the present invention.

Figures 6 and 7 are detail perspective views of the tread block and the guide blocks respectively.

Figure 8 is a detail view of one of the tension bolts.

Figure 4:
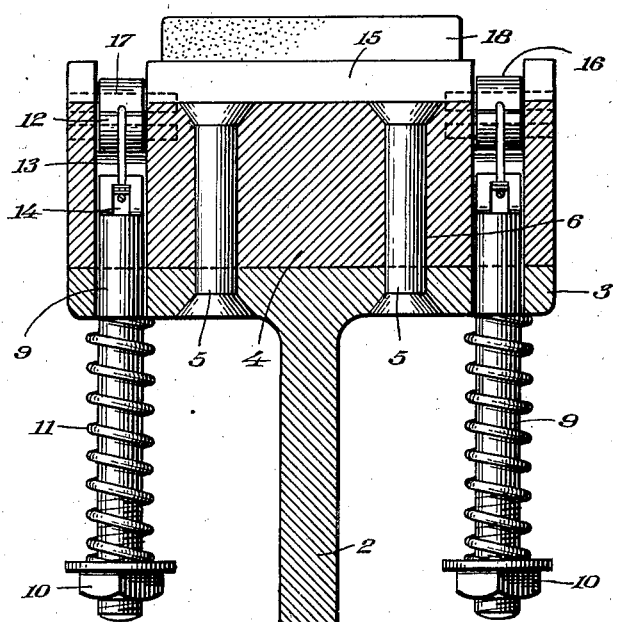
Figure 4 is a transverse section on the line 4—4 of Figure 1.
Figure 5:
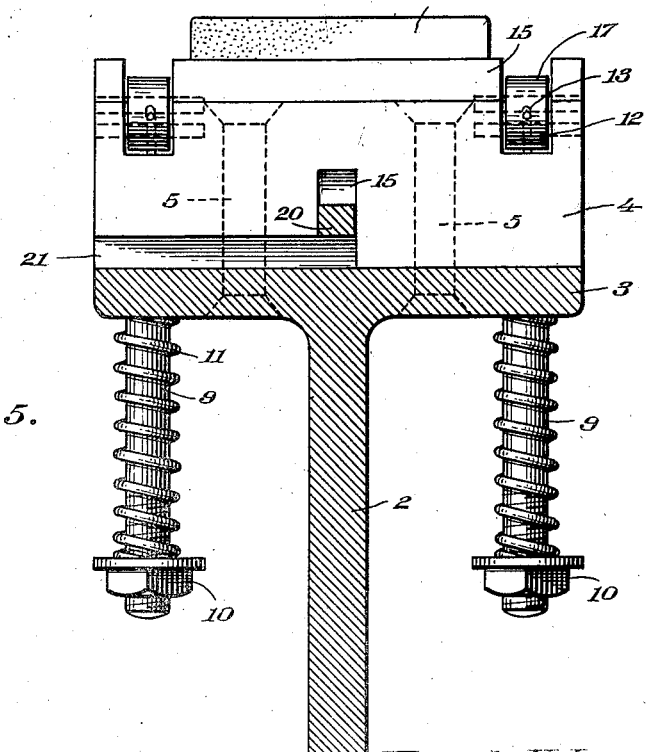
Figure 5 is a transverse section on the line 5—5 of Figure 1.

The invention is illustrated in the accompanying drawings as applied to a disc wheel although it may, of course, be applied to any known or approved form of wheel and in the drawings, the numeral 1 designates the hub of the wheel and the numeral 2 designates the strong central disc constituting the body of the wheel. As shown most clearly in Figures 4 and 5, the disc is formed with a felly member 3 which is preferably formed integral with the disc and this felly member supports the ground-engaging elements and the guide blocks interposed between said elements. Spaced equidistantly about the felly are guide blocks 4 which are secured rigidly in place by fastening bolts or rivets 5 inserted through openings 6 provided therefor in the blocks between the ends thereof, as will be readily understood upon reference to Figures 4 and 7. In the upper side of each of these blocks 4, adjacent each end thereof, is formed a groove or recess 7 which extends entirely across the block and opens through the sides thereof while an opening 8 leads from the bottom of each groove through the bottom of the block. An eye bolt 9 is arranged to co-operate with each of these blocks 4 and has its upper portion engaged in the opening 8 while its lower or inner end projects from the felly 3 radially of the wheel toward the hub, an adjusting nut 10 being mounted upon the inner end of each bolt and a compression spring 11 being coiled around the bolt between said nut and the felly, as shown and as will be understood. Within each groove or recess 7, adjacent the ends thereof, are mounted rollers 12 over which is trained an endless cable 13 which has its portions between the rollers threaded through the eye 14 of the corresponding bolt 9.

Figure 2:
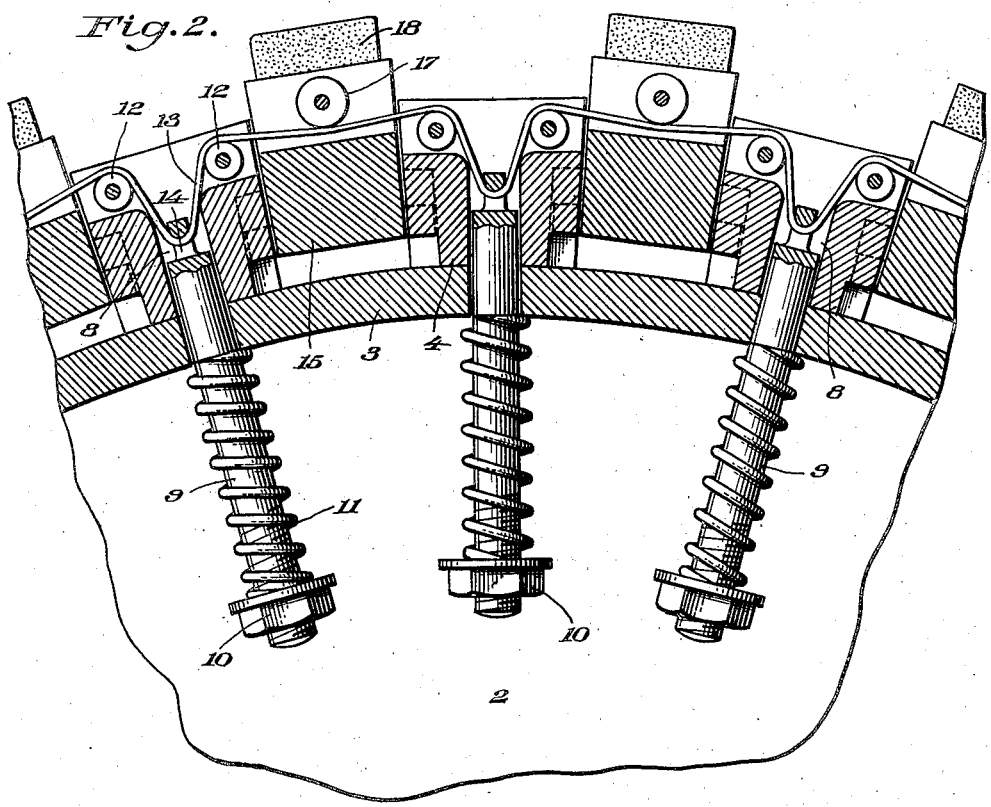
Figure 2 is a longitudinal section through a portion of the wheel showing the tread block sustaining cables and the tension bolts engaged therewith.
Figure 3:
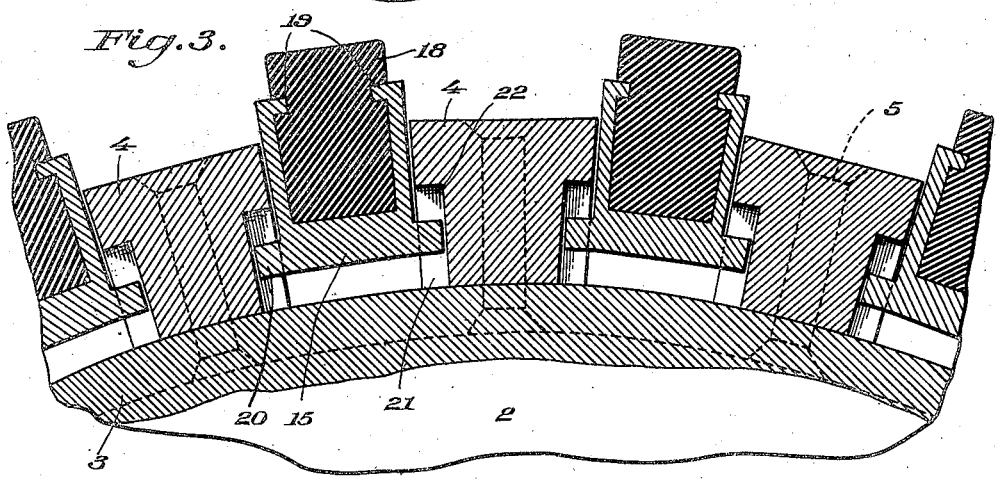
Figure 3 is a similar view taken centrally of the wheel.

Between each two guide blocks 4 there is provided a tread block or ground-engaging element 15 which is provided in its outer side, adjacent each end, with a groove or channel 16 adapted to align with the respective channels 7 of the adjacent guide blocks and mounted centrally in each channel or groove 16 is a roller 17, the adjacent run of the cable 13 passing under the roller 17, as shown in Figure 2. The tread block 15 is hollow through the greater portion of its extent thereby providing a chamber to receive a ground-engaging block 18 which is preferably of rubber, the sides of the block 15 being formed with lugs or inturned flanges 19 which engage in recesses or notches provided therefor in the sides of the elastic block 18 so that the said block will be held against accidental detachment.

To facilitate the assembling of the parts, the blocks 15 are provided on their sides at their centers with lugs or projections 20 which are adapted to engage grooves 21 provided therefor in the sides of the tension blocks 4 and play in notches 23 extending from the inner ends of the channels 21 toward the outer surface of the blocks 4, as will be understood upon reference to Figure 7, the tread blocks being thereby permitted to move radially toward and from the felly 3 but being limited in such movement so that they cannot accidentally drop off the wheel.

From the foregoing description, taken in connection with the accompanying drawings, it will be seen that I have provided a wheel which will have desirable riding qualities and which will require very little attention while in service. The rubber blocks or cushions 18 which directly engage the ground will cushion the impact so that shocks due to travel over rough surfaces will be absorbed and not transferred to the body of the vehicle to cause discomfort to the occupants. As each tread block comes in contact with the ground surface it will yield thereto and tend to ride relatively inwardly upon the wheel but this action immediately increases the tension upon the connecting cable which consequently tends to straighten between the tread blocks while following the inward movement of the blocks. This action, of course, increases the tension upon the springs 11 inasmuch as it tends to pull the bolts 9 outwardly and the springs will, of course, react so as to take up all slack in the cable and return the tread block to its normal outer position as the travel of the wheel continues. It will be readily understood that as the tread block or cushion is brought against the ground it will move inwardly and then outwardly without breaking the contact with the ground owing to the relative travel of the periphery of the wheel and as a result of this action there is no time in which at least one tread block will not be in contact with the ground surface. The wheel is compact, is composed of comparatively few parts and is entirely automatic in its shock-absorbing action.

What I claim is:

1. A resilient wheel comprising a felly, tension blocks secured upon the felly in spaced relation, tread blocks slidably engaged with the tension blocks and disposed between them to be limited in movement thereby, guide rollers mounted in the several blocks, a flexible endless connection trained over the rollers on the tension blocks and under the rollers on the tread blocks, and tension devices mounted in the felly and the tension blocks and engaged with the flexible connection between the rollers on the tension blocks.

2. A wheel comprising a felly, tension blocks secured on the felly around the circumference of the same in spaced relation, said blocks having circumferentially extending recesses in their outer sides adjacent their ends and having openings extending from said recesses through the inner sides of the blocks, rollers mounted in said recesses adjacent the ends thereof, tread blocks mounted upon the felly between the tension blocks and provided with recesses in their outer sides adjacent their ends, rollers mounted in said recesses, an endless flexible connection trained over the rollers in the tension blocks and under the rollers in the tread blocks, and tension devices mounted in the felly and in the tension blocks and engaged by said connection.

3. A wheel comprising a felly, tension blocks mounted thereon and provided with channels in their sides opening through one end, and notches at the inner ends of said channels, tread blocks disposed between the tension blocks and provided on their sides with projections adapted to pass through the channels in the sides of the tension blocks and play in the notches in the inner ends of said channels, a flexible endless connection trained through all the blocks, and tension devices mounted upon the felly and the tension blocks and engaged with said connection.

4. A wheel comprising a felly, a plurality of tension blocks secured upon the felly, tread blocks mounted between the tension blocks, the tension blocks having openings leading through their inner sides and the felly being provided with openings registering with said openings, a flexible endless connection trained through all the blocks, eye bolts slidably mounted in the openings in the tension blocks and the felly and engaged with said flexible connection, coil springs fitted about the eye bolts and bearing at their outer ends against the felly, and abutments on the bolts bearing against the inner ends of the springs.

5. In a resilient wheel, a felly having a plurality of circumferentially spaced sockets therein, a radially slidable tread member mounted in each of the said sockets, a flexible element disposed circumferentially of the felly and engaging the tread members so as to project the latter when the said element is under tension, a plurality of radially slidable bolts mounted on the felly and projecting inwardly thereof at circumferentially spaced intervals, the said bolts engaging the said flexible element, and a coil spring sleeved about the inwardly projecting portion of each bolt to yieldingly hold the flexible member under tension.

FRANK K. LOOMIS.